UNITED STATES PATENT OFFICE.

ARNOLD C. VON HAGEN, OF KANSAS CITY, MISSOURI.

PROCESS OF TREATING WHEAT AND OTHER GRAINS.

1,265,700.  Specification of Letters Patent.  Patented May 7, 1918.

No Drawing.  Application filed September 1, 1916.  Serial No. 117,999.

*To all whom it may concern:*

Be it known that I, ARNOLD C. VON HAGEN, a citizen of the United States, residing in Kansas City, in the county of Jackson and State of Missouri, have invented new and useful Improvements in Processes of Treating Wheat and Other Grains, of which the following is a specification.

This invention relates to an improved process for treating grain, such as wheat, corn, rye, oats, and the like, to sterilize, clean and purify the same. It is well known that grain, especially wheat, is subject to various diseases which not only produce deterioration of the grain, but lessen its value for milling purposes. The commonest of these diseases are those known as "must" and "smut", and it is one of the objects of this invention to enable musty and smutty wheat to be thoroughly cleaned and purified, and all of the infections removed.

It is also known that grain will frequently contain relatively large amounts of acid, caused by the condition of the soil, or by atmospheric conditions, such as undue moisture, which tend to set up fermentation in the grain and cause it to spoil. It is one of the objects of the present invention to counteract or neutralize such acid content of the grain, and prevent fermentation from taking place in the grain, or in the flour or meal made from the grain.

It is further known that, due to the contamination with foreign substances, or from other causes, grain is subject to attack by various bacteria which tend to produce decay, and in other respects cause disease or deterioration of the grain, and it is a still further object of my invention to sterilize the grain and destroy, or prevent the propagation of, bacteria.

In addition to the foregoing objects of the invention, my process of treatment facilitates a thorough cleaning of the grain and the placing of the same in the ideal condition for milling purposes.

My invention is usually practised by adding to the wheat or other grain an alkali, with which is combined a suitable sterilizing agent including an element of the halogen group.

The alkali I prefer to use is calcium hydroxid $Ca(OH)_2$, and the sterilizing or germicidal agent which I prefer is a mixture or compound one of the ingredients of which is an element of the halogen group, for example chlorin. This mixture may be one in which the ingredients are chemically combined, as in a hypochlorite, and is preferably in the form of calcium hypochlorite.

In certain cases, dependent upon the condition of the wheat, I may use the hypochlorite alone. In such case I would use approximately 1 part, by weight, of calcium hypochlorite to form 250 to 1000 parts of water, deviating from these proportions, however, within reasonably wide limits, according to the condition and natural moisture of the grain, and I moisten the grain with the solution. Where the hypochlorite, or other sterilizing agent, is applied with the lime, or other alkali, I proceed, in the use of the preferred agents, by adding 1 part, by weight, of calcium hypochlorite to approximately four parts by weight of calcium hydroxid, varying the proportions within reasonable limits, according to circumstances, as above explained in connection with the use of the hypochlorite alone.

The process may be practised in various ways: For example, the grain may be first moistened and the mixed hypochlorite and calcium hydroxid, in the form of powder, be applied to the grain; or, the powdered substances may be applied to the grain and moisture then added; or, again, the moisture and powdered substances may be applied to the grain simultaneously; or, finally, lime and hypochlorite may be first mixed with water, and then applied to the grain. Preferably, however, I proceed by mixing the dry lime with the wheat, in the proportion of from $\frac{1}{8}$ to an ounce of lime per bushel of grain, and then moisten grain thus treated with the hypochlorite solution, prepared as above. That is to say, the grain is simply moistened and maintained at all times in an unsaturated condition. The alkali acts to neutralize any acid in the grain, the larger percentage of which is in the outer portion of the grain, and to facilitate this action the treatment is such as to permit of the thorough permeation of the outer coating of the grain by the alkali. It also acts to absorb and destroy the greasy or oily foreign substances which frequently adhere to or are produced in the grain by disease, such as smut, must, and the like, and render their removal by the ordinary cleaning processes to be accomplished with great thoroughness. In ordinary atmsophere there is some carbon dioxid ($CO_2$) and this $CO_2$ assisted by the moisture causes the calcium hypochlorite to give off a certain amount of chlorin. The property of the hypochlorite is to destroy all organisms which tend to cause fermentation in the wheat, or resulting flour or bran. The hypochlorites have a selective action on all types of fermentative organisms, and, so far as my information goes, there is no other chemical which has this selective action in so marked a degree.

It may be noted that as the active agent in calcium hypochlorite is chlorin, the latter element itself may be used instead of the hypochlorite. If chlorin be employed as the sterilizing agent it would be used in liquid form, that is to say my mixture then consists of chlorin gas dissolved in water. In either case the active chlorin rapidly combines with organic substances in or on the grain to form chlorids in exerting the germicidal action, so that such an application to the grain must be made at the time the effect is desired. This is because of the fact that when the mixture carrying the chlorin comes in contact with the grain it operates to release chlorin which then exerts a germicidal action upon the grain. That is to say, the releasing of the chlorin from the substance carrying it, occurs during contact of the substance with the grain, in other words, on the surface of the grain. The automatic destruction, so to speak, of the active chlorin after the harmful bacteria are destroyed is, however, a desirable thing in itself, as, after the harmful bacteria are destroyed, there is no longer any necessity for the presence of chlorin hypochlorite, or other germicidal agents. If chlorin alone is used I would employ approximately the same amount as in the use of the hypochlorite, although it is possible to use much less chlorin than hypochlorite with the same amount of water.

One of the advantages peculiar to my process lies in the fact that chlorin is released on the surface of the grain. If the grain were saturated or submerged such chlorin would immediately be taken up and greatly diluted by the excess of water. According to my process the combination of the chlorin in the hypochlorite is broken up substantially upon the surface of the grain, and the chlorin does not become immediately diluted, but immediately attacks and combines with the substance on the surface of the grain. The slight amount of moisture on the surface of the grain makes this action possible and at the same time increases the adhesion of the chlorin to the surface of the grain without substantially diluting the chlorin. In other words, the moisture enables and accelerates the action of the chlorin on the grain.

I am aware that elements of the halogen group have been used for treating grain, but my invention is distinguished from such prior inventions by reason of the fact that according to my invention the active element is applied to the grain in an unstable condition, for example as chlorin dissolved in a small quantity of water, or as calcium hypochlorite in the presence of a small quantity of moisture; the action of the moisture on the hypochlorite is to render the hypochlorite compound unstable. In either case the active element such as chlorin, is brought into contact with the surface of the grain, in a condition to combine chemically with the organic substances on the grain, thereby exerting a germicidal action.

It should be distinctly understood that in practising my invention the substance carrying the active element, or chlorin, is thoroughly mixed throughout the mass of grain so that it becomes distributed or disseminated throughout the entire mass, on the surface of the grains. The substance then gives up its chlorin at all points throughout the entire mass of grain and on the surfaces of the grains composing the mass. In this way I attain the effect of developing the germicidal action on the surface of each grain in the mass. This method is far more effective, than that of attempting to cause a germicidal gas to permeate a mass of grain.

I claim:

1. The process of treating grain which consists in mixing with the natural grain in the presence of moisture, a substance including an element of the halogen group, thereby disseminating said substance on the surfaces of the grains throughout the mass of grain, said substance operating during contact with the grain to release said element from said substance throughout the mass of grain on the surfaces of the grains, and maintaining the grain during treatment in a moist but unsaturated condition to enhance the release of said element, prevent dilution thereof, and enable said element to combine chemically with the substances on the surface of the grains and thereby exert a germicidal action on the grain.

2. The process of treating grain which consists in mixing with the natural grain in the presence of moisture, a substance including chlorin, thereby disseminating said chlorin on the surfaces of the grains throughout the mass of grain, said substance operating during contact with the grain to release said chlorin from said substance on the surface of the grains and throughout the mass of grain, and maintaining the grain during treatment in a moist but unsaturated condition to enhance the release of said chlorin, prevent dilution thereof, and enable said chlorin to combine chemically with the substances on the surface of the grains, and thereby exert a germicidal action on the grain.

3. The process which consists in treating the grain by coating the natural grain with hypochlorite in the presence of moisture insufficient in amount to saturate the grain, said hypochlorite operating during contact with the moisture and the grain, to release chlorin, and effect the chemical combination of the released chlorin of the hypochlorite with the organic substances on the grain, thereby exerting a germicidal action.

4. The process which consists in treating the grain by coating the natural grain with an alkaline substance to neutralize the acidity of the grain, simultaneously coating the grain with hypochlorite in the presence of moisture insufficient to saturate the grain, the said hypochlorite operating during contact with the moisture and the grain to release chlorin, and effect a chemical combination of the released chlorin of the hypochlorite with the organic substances on the grain, thereby exerting a germicidal action.

5. The process which consists in treating the grain by coating the natural grain with calcium hydroxid to neutralize the acidity of the grain, and simultaneously treating the grain with calcium hypochlorite, maintaining the grain during treatment in a moist but unsaturated condition, said hypochlorite operating during contact with the grain in the presence of moisture, to release chlorin, and effect a chemical combination between the released chlorin of the hypochlorite and the organic substances on the grain, thereby exerting a germicidal action.

In testimony whereof, I have hereunto set my hand.

ARNOLD C. VON HAGEN.